United States Patent
Sadan et al.

(10) Patent No.: US 8,212,379 B2
(45) Date of Patent: Jul. 3, 2012

(54) STATION COMMUNICATIONS OVER ELECTRICAL TRANSMISSION LINES

(75) Inventors: Nachum Sadan, Carlisle, MA (US); Norman A. Strandberg, Westford, MA (US); Philip M. Trioli, New Boston, NH (US); Bruce A. Renz, Columbus, OH (US)

(73) Assignee: Amperion, Inc., Lawrence, MA (US)

( * ) Notice: Subject to any disclaimer, the term of this patent is extended or adjusted under 35 U.S.C. 154(b) by 284 days.

(21) Appl. No.: 12/661,035

(22) Filed: Mar. 8, 2010

(65) Prior Publication Data

US 2010/0296560 A1 Nov. 25, 2010

Related U.S. Application Data

(60) Provisional application No. 61/158,312, filed on Mar. 6, 2009.

(51) Int. Cl.
*H04L 5/14* (2006.01)
*H04M 1/00* (2006.01)
*H04M 11/00* (2006.01)

(52) U.S. Cl. ............................................ 307/1; 307/125
(58) Field of Classification Search ............... 307/1, 125
See application file for complete search history.

(56) References Cited

U.S. PATENT DOCUMENTS

| 5,684,450 A | 11/1997 | Brown |
| 5,929,750 A | 7/1999 | Brown |
| 5,933,071 A | 8/1999 | Brown |
| 6,040,759 A | 3/2000 | Sanderson |
| 6,144,292 A | 11/2000 | Brown |
| 6,172,597 B1 | 1/2001 | Brown |
| 6,282,405 B1 | 8/2001 | Brown |
| 7,535,685 B2 * | 5/2009 | Sandahl et al. ............. 361/38 |
| 7,778,514 B2 * | 8/2010 | Zitting et al. ............. 385/147 |
| 2008/0100403 A1 | 5/2008 | Daley |

FOREIGN PATENT DOCUMENTS

WO   WO 2006/042274   4/2006

* cited by examiner

*Primary Examiner* — Adi Amrany
*(74) Attorney, Agent, or Firm* — Ware, Fressola, Van Ser Sluys & Adolphson LLP

(57) ABSTRACT

A communication device for use on high voltage power lines provides for broadband communications over such high voltage power lines. The device has an impedance matching circuit configured to connect at one end to a high voltage line arrester of the high voltage power line, as well as a limiter circuit coupled to the other end of the impedance matching circuit to limit a voltage associated with a broadband signal. A noise blanker circuit is coupled at one end to this other end of the impedance matching circuit and is configured to inhibit presentation of a time delayed incoming signal to the broadband modem upon detection of electrical noise. The communication device can further comprise link aggregation and/or a differential circuit for providing non-inverted and inverted broadband signals for both reception and transmission. A corresponding method of communicating broadband information over a high voltage power line is disclosed.

27 Claims, 15 Drawing Sheets

TVS = Transient Voltage Suppressor

Relationship between power line voltage waveform and temporal structure of a typical microspark breakdown process

STATION COMMUNICATIONS OVER ELECTRICAL TRANSMISSION LINES

CROSS REFERENCE TO RELATED APPLICATION

This application claims priority under 35 USC §119 to U.S. Provisional Patent Application No. 61/158,312 filed on Mar. 6, 2009.

TECHNICAL FIELD

The present invention relates to communications between electrical utility substations using Broadband over Powerline also known as BPL technology over High Voltage (HV defined as 138 KV and above) transmission lines and Medium Voltage (MV) sub-transmission and distribution lines.

BACKGROUND OF THE INVENTION

BPL has been used over Low Voltage (LV) lines for in home networking applications and over Medium Voltage (MV) distribution lines for last mile access of broadband and smart grid applications. This is the first adaptation of this technology for station to station communications over electrical transmission lines. The characteristics of electrical transmission lines are a good match for BPL since the line loss (measured in, for example, dB per linear feet) is much lower than MV distribution lines, and there are few or no taps connected, to the line. The topology is a point to point straight line without branches, which translates to a longer distance of signal reach. The main technical challenge is maintaining BPL communications in a harsh electrical environment. The present invention provides a stable, high performance and highly available communication system over HV.

Traditionally, utilities used various communications technologies to connect their substations. Those are divided into two categories: in line and off line. Off line communication methods include: fiber optic cables, telephone copper wire, microwave RF radios, and wireless leased lines. The only in line communications methods so far have been Power Line Communications (PLC) over the existing power lines and fiber embedded in the ground wire called OPGW—Optical Ground Wire. Applications that use station-to-station communications are: protective relaying and line control, supervisory control and data acquisition (SCADA) management, sensing and power quality monitoring, voice services, and video surveillance.

Most recently with the advancements in digital technology, superior digital protection schemes such as line current differential, and superior sensing schemes such as synchrophasors, have become available. These and other new smart grid applications will require more bandwidth than the existing narrowband methods can provide. The use of broadband communications technologies such as fiber and HVBPL (High Voltage BPL) enables the deployment of such advanced methods of protection, monitoring and control. The term HVBPL is used herein to cover all transmission and sub-transmission voltages, even though the electric industry definition of HV is for 138 KV and above. Since the HVBPL technology uses the utility's own wires, there is a significant cost benefit (e.g. 10 to 1) compared to fiber, and it significantly reduces the deployment time, and simplifies the installation process.

A substation is typically used as a distribution point for transmission lines coming into the station and for multiple MV distribution feeders going out of a station to serve residential, commercial and industrial customers. The transmission lines terminate on the primary side of a step down transformer inside the substation, and the distribution lines are connected to its secondary side. The utility network uses a star topology over the distribution grid with the station being at its center. Substations usually cover an area of 3-5 square miles and are interconnected over transmission or sub-transmission lines. Typical voltage ratings used for sub-transmission lines in North America are 34 KV, 46 kV, and 69 kV (voltage rating in Europe and other parts of the world may be different).

Electric transmission lines are better balanced, more uniform and have lower losses than MV distribution lines. This is due to the fact they run in point to point mode between stations and do not branch like MV lines. They also have far fewer taps and discontinuities than MV lines do. This topology difference is a key factor in achieving better performance and longer distance of the BPL signal. Another difference is in the quality of the conductor wire and the quality of the construction. This difference is represented in a lower loss of energy and a longer distance of the transmitted signal measured in, for example, dB per feet.

Below is a list of U.S. patents that describe the method of using electrical power lines as a communications medium for delivery of broadband data. This technology is now known as Broadband over Powerline or BPL. Broadband is defined as transmission over 1 MHz (typically from 1 MHz to 50 MHz) and typically has data rates of multiple Mbps.

| Broadband over Powerline (BPL) Patents | |
|---|---|
| 5,684,450 | Electricity Distribution and/or Power Transmission Network and Filter for Telecommunications over Power Lines |
| 5,929,750 | Transmission Network and Filter Therefore |
| 5,933,071 | Electricity Distribution and/or Power Transmission Network and Filter for Telecommunication over Power Lines |
| 6,144,292 | Powerline Communications Network Employing TDMA, FDMA and/or CDMA |
| 6,172,597 | Electricity Distribution and/or Power Transmission Network and Filter for Telecommunication over Power Lines |
| 6,282,405 | Hybrid Electricity and Telecommunications Distribution Network |

SUMMARY OF THE INVENTION

This invention implements a new communications method between substations, using Broadband over Powerline (BPL) technology. BPL, like Powerline Communications (PLC) that has been used by utilities for many years, utilizes the electrical grid as the communications medium. Unlike deployed PLC systems, that use lower frequencies of less than 1 MHz and features low data rates of only single or tens of Kbits/sec, HVBPL uses a frequency range that is higher than 1 MHz and reaches data rates of tens of Mbits/sec. The advantage for the utility in using its own wires for line applications and for data communications is lower cost, greater administrative control and added functionality.

As of yet, there has been no effective use of power transmission lines between substations as a medium for broadband communications.

Older technologies, such as pilot wire using copper telephone wires are very expensive and are being phased out by the wireline telephone companies. Wireless connectivity requires building towers. Using fiber optic cables requires trenching underground or hanging the cables overhead. Both of these options are labor intensive, time-consuming and very expensive. In some cases, the utility has to negotiate right-of-way permits before the work can commence, a process that can take months or even years to conclude.

In other cases where the utility does not own the network, such as when it is using an external network provider with leased private lines or a public cellular network, there is an additional usage charge involved.

In contrast, with HVBPL the utility already owns the infrastructure, the installation is quick and easy, and the cost of the communications equipment is very low in comparison to the alternatives.

In many areas, due to topographical challenges of the terrain and the high cost of installation, utilities have chosen not to connect stations to their communications network, or to connect only few critical stations. That has left many stations without the ability to be fully managed and protected. The purpose of this invention is to address this gap.

HVBPL communications expands the coverage of the utility network, and enables new smart grid applications to be deployed. Having broadband communications is fundamental to the ability for deploying multiple smart grid applications that will enhance service availability, while improving power quality and grid reliability. Asset protection and station surveillance is one such critical application that requires a high bandwidth communications network for delivery of video streams. The increased trend of copper theft from inside the stations and the cyber and physical security threats of a terrorist attack require better methods of protection. Today, these unconnected (in the communication sense) remote stations are only protected by a lock and a gate with no real-time visibility by the utility operator. The U.S. Department of Homeland Security (DHS) and the U.S. Department of Energy (DOE) require addressing this deficiency and have made it a national priority. HVBPL achieves this requirement with a very competitive price/performance solution.

Digital protection and line control applications require a number of communications network characteristics: high availability, low latency and real-time response. Other data intensive applications such as video surveillance require high bandwidth. Only two technologies can support broadband communications and provide the required specifications: point to point fiber and HVBPL. While fiber is the preferred communications medium, it comes with a very high cost and significant deployment challenges as stated above. HVBPL can be deployed where there is no fiber (most of the US stations with 138 kV lines or below have no fiber) and as a secondary backup method to fiber. Another application is a combination of both methods, using HVBPL as an extension to a fiber backbone network. For example a 230 kV or 345 kV EHV line with fiber that has 138 kV or 115 kV extensions that can be covered by HVBPL.

To maintain and recover the BPL signal in the presence of electrical noise, a number of techniques are used in the present invention. Single ended transmission with direct launch is used on a single wire (one phase of a three phase line). Differential coupling uses two phases for noise cancellation, emissions reduction and added stability. Link aggregation further enhances system availability by bonding the two communication links on the two phases. Link aggregation can be single ended when two separate modems are used, one on each phase, or it can be differential as shown in FIG. 3. Advanced band pass filtering circuits are added to protect the BPL signal from out of band noise and facilitate channel allocations for FDM mode and link aggregation. RF protection circuits for lightning and other fast transient conditions are implemented as part of the system design. One embodiment uses different Transient Voltage Suppressor (TVS) threshold settings to limit the voltage level on the Receive (RX) and Transmit (TX) paths. The TX Limiter circuit protects the transmitter from a high amplitude transient voltage generated by spikes associated with powerline noise without degrading the transmitted signal. The RX Limiter circuit protects the receiver by clipping the input signal at a lower voltage to protect the dynamic range of the receiver from transient voltage conditions. Protecting the receiver input signal enhances system performance.

Another embodiment uses a noise (gate) blanker to open and close the RF signal path when strong transient conditions (e.g. narrow pulse noise) are detected. The blanker rapidly opens during an impulse noise event and closes after the event passes. This allows the system to operate in very strong noise conditions.

An embodiment of the present invention is a communication device comprising an impedance matching circuit configured to connect at one end to a high voltage line arrester of a high voltage power line, a limiter, such as a transient voltage suppressor, coupled to another end of the impedance matching circuit, and a noise blanker circuit coupled at a first end to another end of the impedance matching circuit and configured to connect at a second end to a broadband modem, the noise blanker circuit having a delay circuit configured to time delay an incoming signal from the impedance matching circuit, a noise detector configured to detect electrical noise, and a blocking gate configured to receive the time delayed incoming signal and to inhibit presentation of said time delayed incoming signal to the broadband modem upon detection of electrical noise by the noise detector.

Another embodiment of the present invention is a communication device with a high frequency impedance blocking device configured to present a high frequency impedance between earth ground and the line arrester and further configured to be coupled to the noise blanker circuit.

Another embodiment of the present invention is a communication device with a high frequency impedance blocking device which comprises ferrite beads.

Another embodiment of the present invention is a communication device with a noise blanker configured to connect to a receiver of the broadband modem at said second end and to a differential circuit at said first end, the differential circuit configured to present a transmission signal from the modem in both a non-inverted and a substantially inverted form, the non-inverted form of the transmission signal configured to be presented to the impedance matching circuit; wherein the communication device further comprises a second impedance matching circuit configured to receive the inverted transmission signal for presentation to a second high voltage power line through a second line arrester.

Another embodiment of the present invention is a communication device with a second transient voltage suppressor configured to present a voltage suppression of the incoming signal the second limiter circuit having a suppression voltage lower than the suppression voltage of the transient voltage suppressor coupled to the impedance matching circuit.

Another embodiment of the present invention is a communication device with a second transient voltage suppressor which receives the incoming signal via a transmit/receive switch which in turn is operable to connect the incoming signal to the second transient voltage suppressor when a signal is being received.

Another embodiment of the present invention is a communication device where the peak voltage of the second transient voltage suppressor is approximately two volts.

Another embodiment of the present invention is a communication device wherein a transient voltage suppressor suppresses signals having a voltage greater than approximately 10 volts.

Another embodiment of the present invention is a communication device where the line arrester has a high capacitive value for RF signals ranging from approximately 1 to 50 MHz Another embodiment of the present invention is a communication device where a disconnector device positioned between the line arrester and the impedance matching circuit, the disconnector configured to disconnect the line arrester from the remainder of the communication device if the associated power line is struck directly by lightning.

Another embodiment of the present invention is a communication device where an impedance matching circuit comprising a lightning protection device to protect the remainder of the impedance matching circuit from lightning strikes.

Another embodiment of the present invention comprises a plurality of communication devices, each communication device configured to connect to the high voltage power line at physically separated locations of said power line.

Another embodiment of the present invention comprises a plurality of communication devices, each communication device having a differential module configured to connect to the high voltage power lines at physically separated locations of two power lines.

Another embodiment of the present invention is a communication device comprising a second limiter circuit configured to present a voltage suppression of the incoming signal, the second limiter circuit having a suppression voltage lower than the suppression voltage of the limiter circuit coupled to the impedance matching circuit.

Another embodiment of the present invention is a communication device where the second limiter circuit receives the incoming signal via a transmit/receive switch which in turn is operable to connect the incoming signal to a transient voltage suppressor when a signal is being received.

Another embodiment of the present invention is a communication device where the peak voltage of the second limiter is approximately two volts.

Another embodiment of the present invention is a communication device comprising a link aggregation switch configured to be connected to the broadband modem and a second broadband modem downstream from a noise blanker, the link aggregation switch configured to provide link aggregation to the signal.

Another embodiment of the present invention is a communication device comprising a link aggregation switch configured to be connected to the broadband modem and a second broadband modem downstream from the differential circuit, the link aggregation switch configured to provide link aggregation to the signal downstream from the noise blanker circuit.

Another embodiment of the present invention is a communication device comprising a bandpass filter configured to limit the signal to the broadband modem within a predetermined frequency range.

Another embodiment of the present invention is a communication device comprising a processor configured to control the frequency range of the bandpass filter.

Another embodiment of the present invention is a communication device comprising a bandpass filter configured to limit the signal to the broadband modem within a predetermined frequency range.

Another embodiment of the present invention is a communication device comprising a processor configured to control the frequency range of the bandpass filter.

Another embodiment of the present invention is a method of communicating broadband information over a high voltage power line comprising receiving an incoming signal from the high voltage power line containing broadband information after said signal is passed through a line arrester connected to the power line, delaying the incoming signal and simultaneously detecting the incoming signal for the presence of electrical noise and, if present and if electrical noise is detected, blocking the delayed incoming signal so as not to be presented to a broadband modem and further presenting an outgoing signal from the broadband modem to an impedance matching circuit so as to impedance match the outgoing signal to the impedance of the power line and associated line arrester while simultaneously providing a high impedance between the outgoing signal and ground for the operating frequency band of the outgoing signal.

Another embodiment of the present invention comprises performing the actions for a second high voltage power line, wherein the outgoing signal presented to the second high voltage power line is substantially inverted with regard to the outgoing signal presented to the first high voltage power line.

A further embodiment of the present invention performs link aggregation of the signal relative to two broadband modems.

BRIEF DESCRIPTION OF THE DRAWINGS

The accompanying drawings illustrate embodiments of the invention, and together with the general description given above and below, serve to explain the principles of the invention. As shown throughout the drawings, like reference numerals designate like or corresponding parts.

DETAILED DESCRIPTION

Although the present invention is directed to providing broadband communication over high voltage (HV) power lines that typically operate at or above 138 KV, it can be used on power lines operating at lower voltages, such as above 30 KV. Furthermore, the constraints with respect to providing broadband communications over HV power lines are mandated by regulatory authorities, such as the U.S. Federal Communication Commission (FCC) that limit broadband power levels to approximately 34 db. This can pose severe problems for such broadband communications, especially when electrical noise on such HV power lines can fluctuate and may have a noise floor that approaches or exceeds the 34 db limit that the broadband signal may not exceed.

Figure 1:
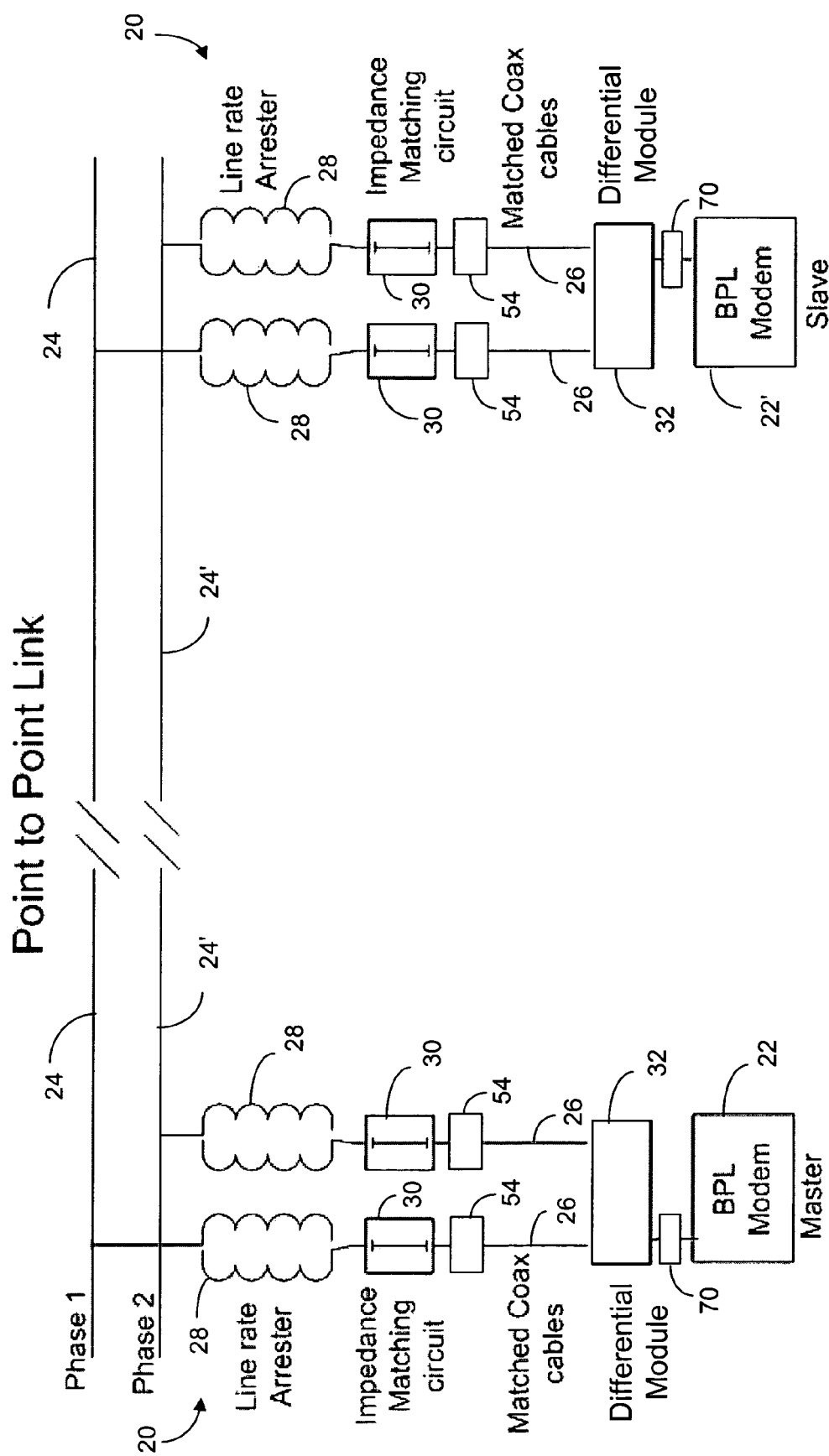
FIG. 1 is a block diagram of station communications with point to point HVBPL according to the present invention

The block diagram in FIG. 1 shows the main elements of an RF communications path of a communication coupler 20 according to the present invention for two substations (typically called stations) 21 and 21' of a high voltage (HV) power line transmission system. Such stations are sometimes referred to as nodes herein. Such an HV transmission system typically has three HV power lines that are 120° phase shifted relative to each other (3 phase power). At station 21, a master BPL modem 22 injects an RF signal on both phases of HV power lines 24, 24' through a differential module 32 connected via a pair of matched coax cables 26 to two coupling devices that are made of standard utility station class line arresters 28 (used as capacitors for low impedance in the operating high frequency range (e.g., 1 MHz to 50 MHz) of the broadband signal and impedance matching circuits 30. At the other station 21', there is a similar setup with a slave BPL modem 22' that extracts the broadband signal from the line and communicates with the master modem at the other end of the link. A differential module 32 applies the BPL signal on one phase (e.g., phase 1—HV line 24) and the signal's mirror image (inverted phase) on the other phase (e.g., phase 2—HV line 24'). This allows common mode noise that appears on both phases to be cancelled out when the signal is extracted at the receiving end. It also provides for cancellation of radiated signals produced by the HV lines 24, 24'. Procedures to insure path distances on both phases are a requirement for optimal differential operation, as described in more detail below. Differential coupling increases stability and operational distance between the two end points (21, 21'). Single ended operation is also possible, using only one set of couplers without the differential module. It should be noted that differential coupling is best suited for transmission line applications. For distribution line applications the differences in the parameters of the two phases may rule out this approach. Voltage limits 54 and impulse noise blanker 70 are provided to reduce electrical interference as explained below.

Figure 2:
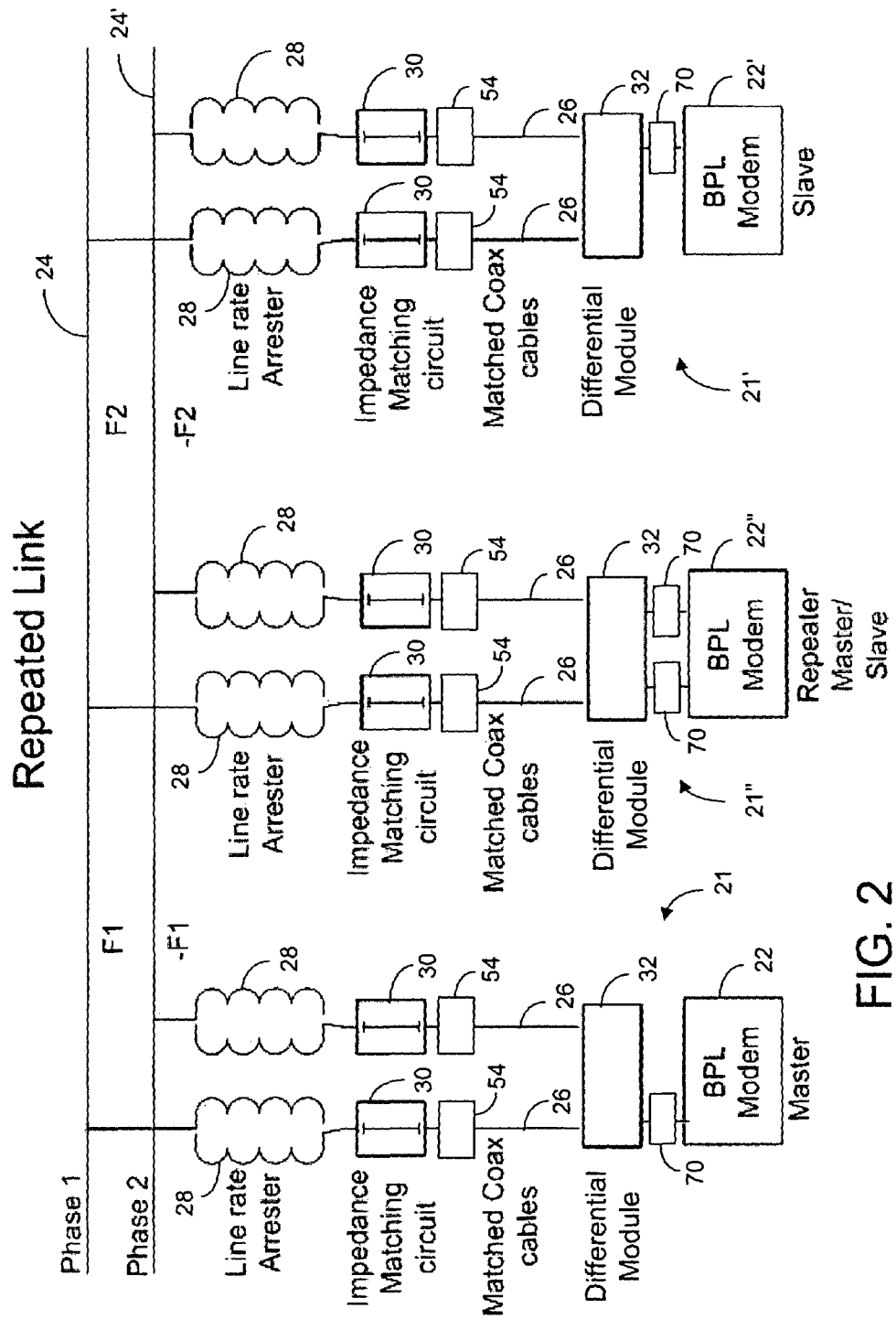
FIG. 2 is a block diagram of station communications with repeated HVBPL according to the present invention
Figure 11:
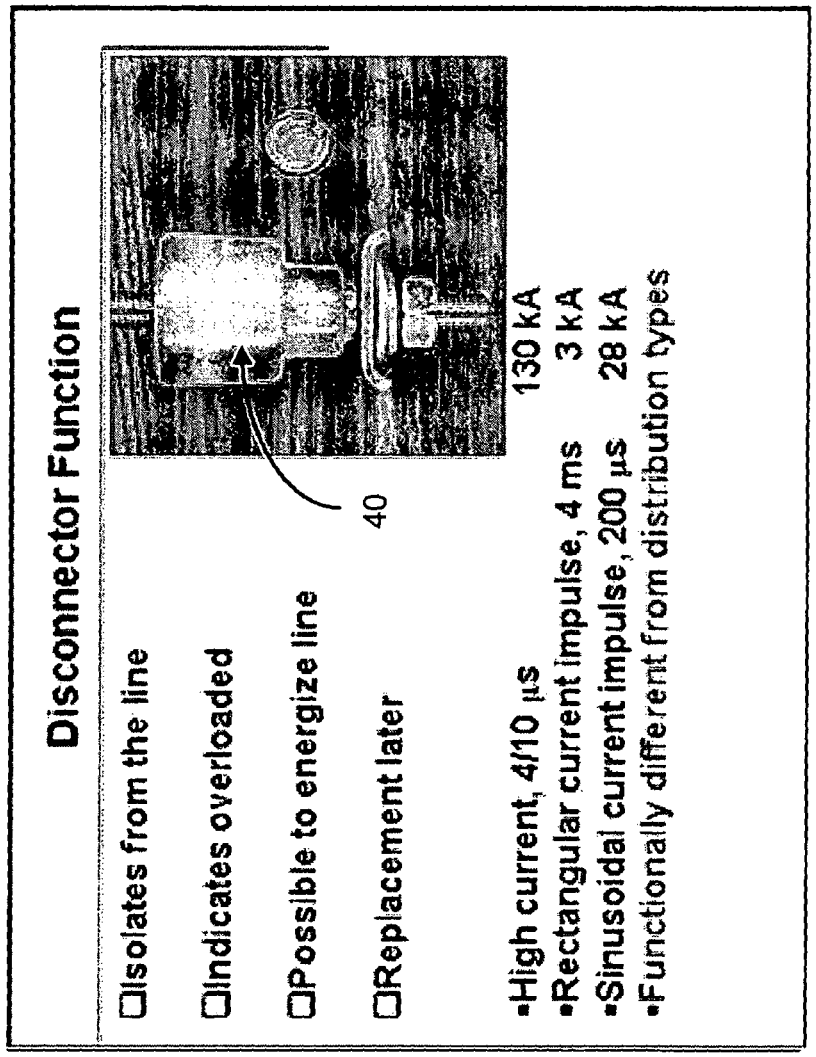
FIG. 11 is a view of a disconnect device that can be used with a transmission line arrester (TLA) installed on a transmission pole according to the present invention
Figure 12:
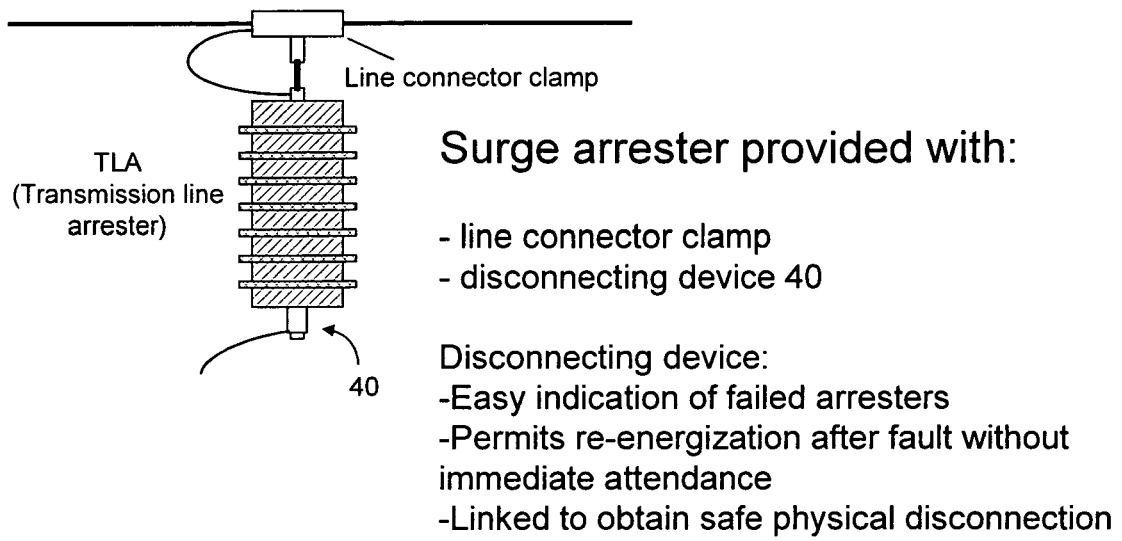
FIG. 12 is an illustration of a repeating node that uses TLA couplers with a disconnect device according to the present invention

A repeating scheme is shown in FIG. 2. The master and slave modems at each end station 21, 21' use station class line arresters (sometimes referred to as line arrester couplers) while the intermediate repeater node 21" uses a transmission line arrester (sometimes referred to as transmission line arrester class couplers) with a line disconnect protection device 40 as optionally shown in FIG. 5 and as shown in FIGS. 11 and 12. The repeated link can use FDM (frequency division multiplexing) with different frequencies or TDM (time division multiplexing) using the same frequency. For example: F1 and F2 can be 5 MHz channels used for FDM while a 10 MHz channel can be used for TDM. The Repeater modem 22" is mounted on a transmission pole (not shown) powered from a local AC source, with a DC battery backup unit to insure communications during a power outage. Voltage limits 54 and impulse noise blanker 70 are provided to reduce electrical interference as explained below.

Figure 3:
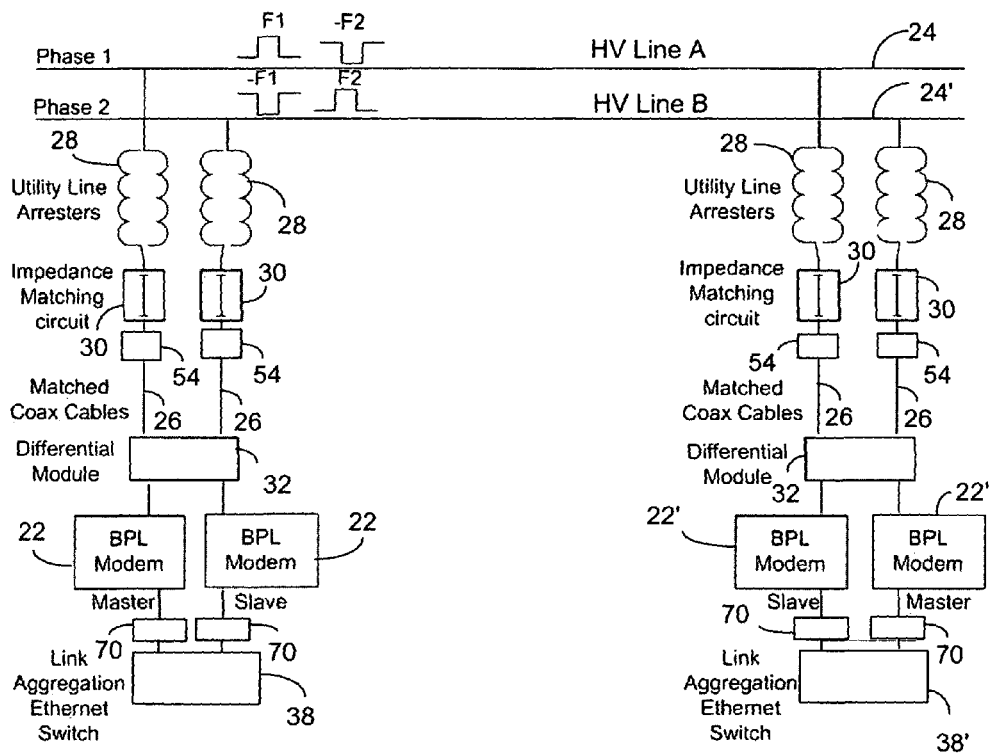
FIG. 3 is a block diagram of station communications with link aggregation according to the present invention
Figure 14:
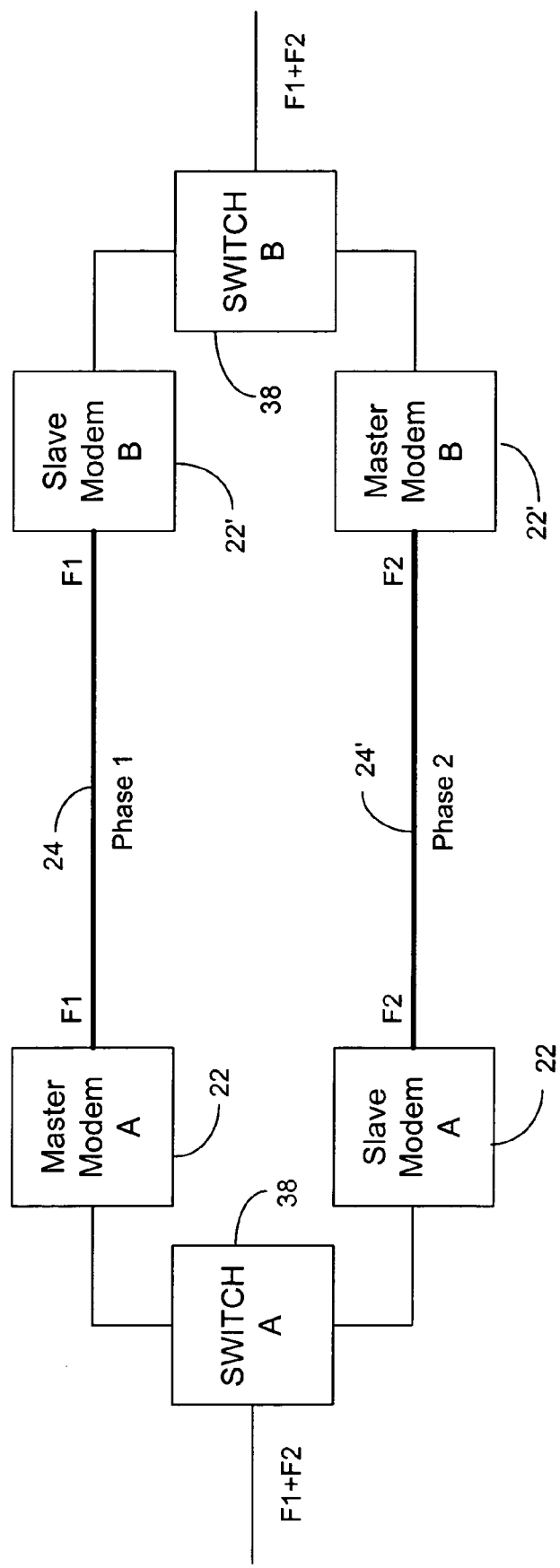
FIG. 14 is a block diagram of station communications with point-to-point HVBPL with link aggregation
Figure 15:
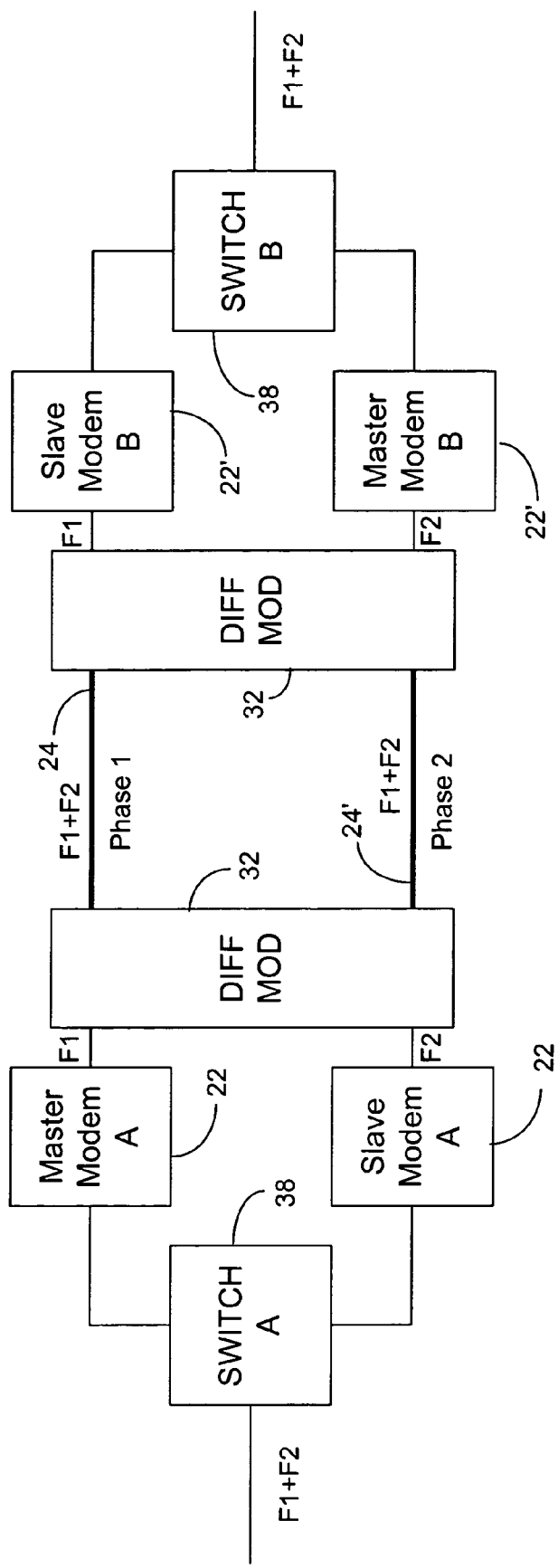
FIG. 15 is a block diagram of station communications with point-to-point HVBPL with link aggregation and with differential modules

Link aggregation is shown in FIGS. 3, 14, and 15. Link aggregation is a well known Ethernet IP protocol that is used in many enterprise applications for redundancy and improved throughput. In redundancy and failover mode this protocol provides instantaneous switching from a link that goes down to a standby link, with the standby link seamlessly absorbing the traffic. In load balancing mode, the protocol uses both active links and provides higher throughput by combining them. The overall result of adding link aggregation to this system is higher availability (due to its redundancy feature) and higher throughput (due to its aggregation feature). FIG. 3 illustrates the use of two frequency bands, channels F1 and F2, over two line phases. The channel bonding is done at the link aggregation switch. Link aggregation switches 38 and 38', such as a link aggregation Ethernet switches are used to provide for link aggregation. As seen in FIGS. 14 and 15, link aggregation can be employed in a single ended link configuration or in a differential link aggregation. Link aggregation can be used with repeater nodes 21", as well as station nodes 21, 21' (see FIG. 2, for example).

Figure 4:
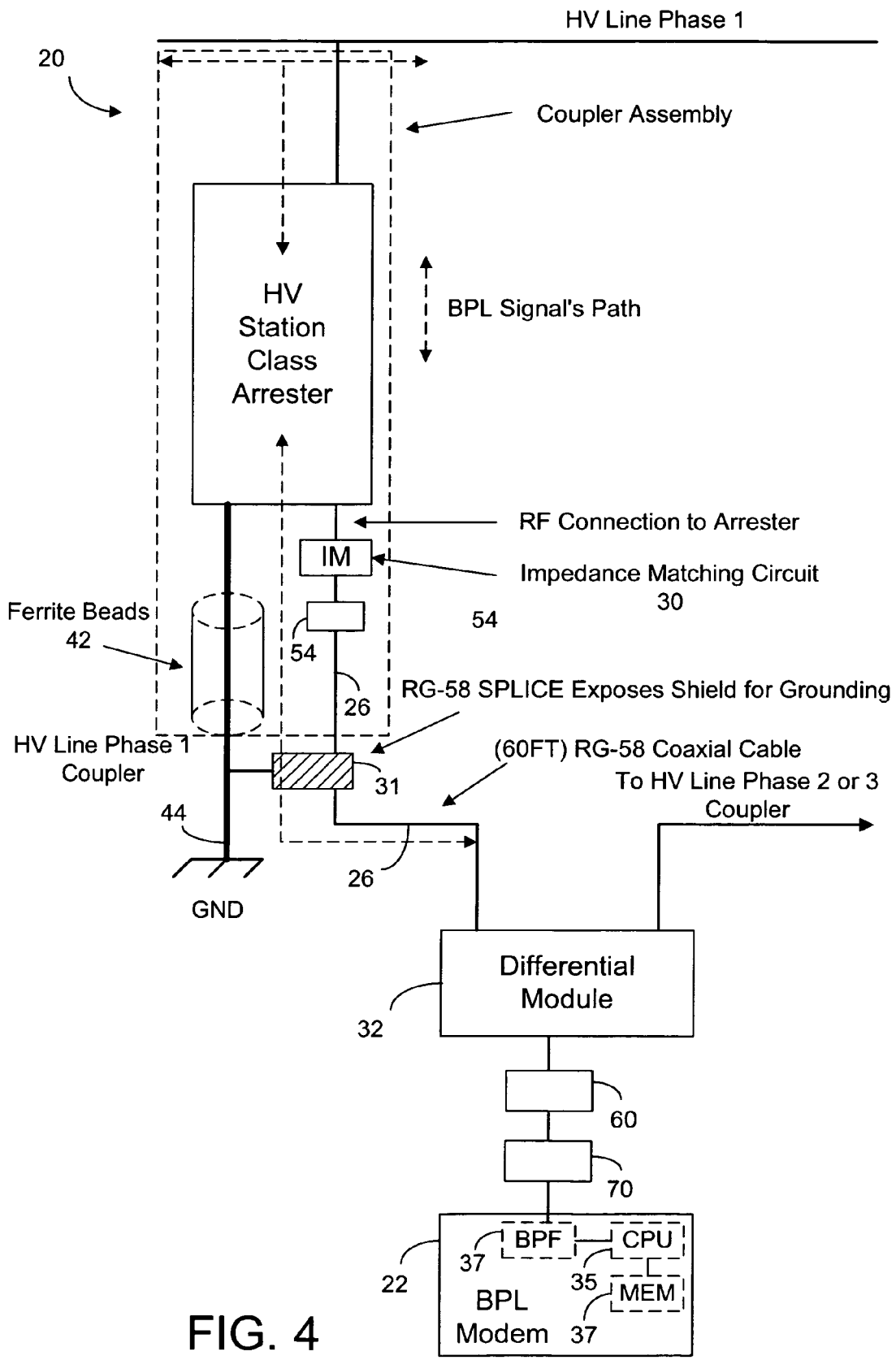
FIG. 4 is a detailed block diagram of an HVBPL coupler according to the present invention with a differential module

A detailed design of the HVBPL coupler 20 is shown in FIG. 4. The coupler uses a standard utility class line arrester 28, a specially designed impedance matching circuit 30 and an optional differential module 32 connected to a BPL modem 22. A noise blanker circuit 70 blocks impulse electrical noise from the incoming (receive) broadband signal. A single ended configuration uses only one phase and one coupler while a differential scheme uses two couplers on two different phases. FIG. 14 shows a single ended configuration with link aggregation. The differential circuit is required for the differential configuration. FIG. 15 shows a differential configuration with link aggregation. The coaxial cable 26 has its shield connected to earth ground at box 31.

Figure 5:
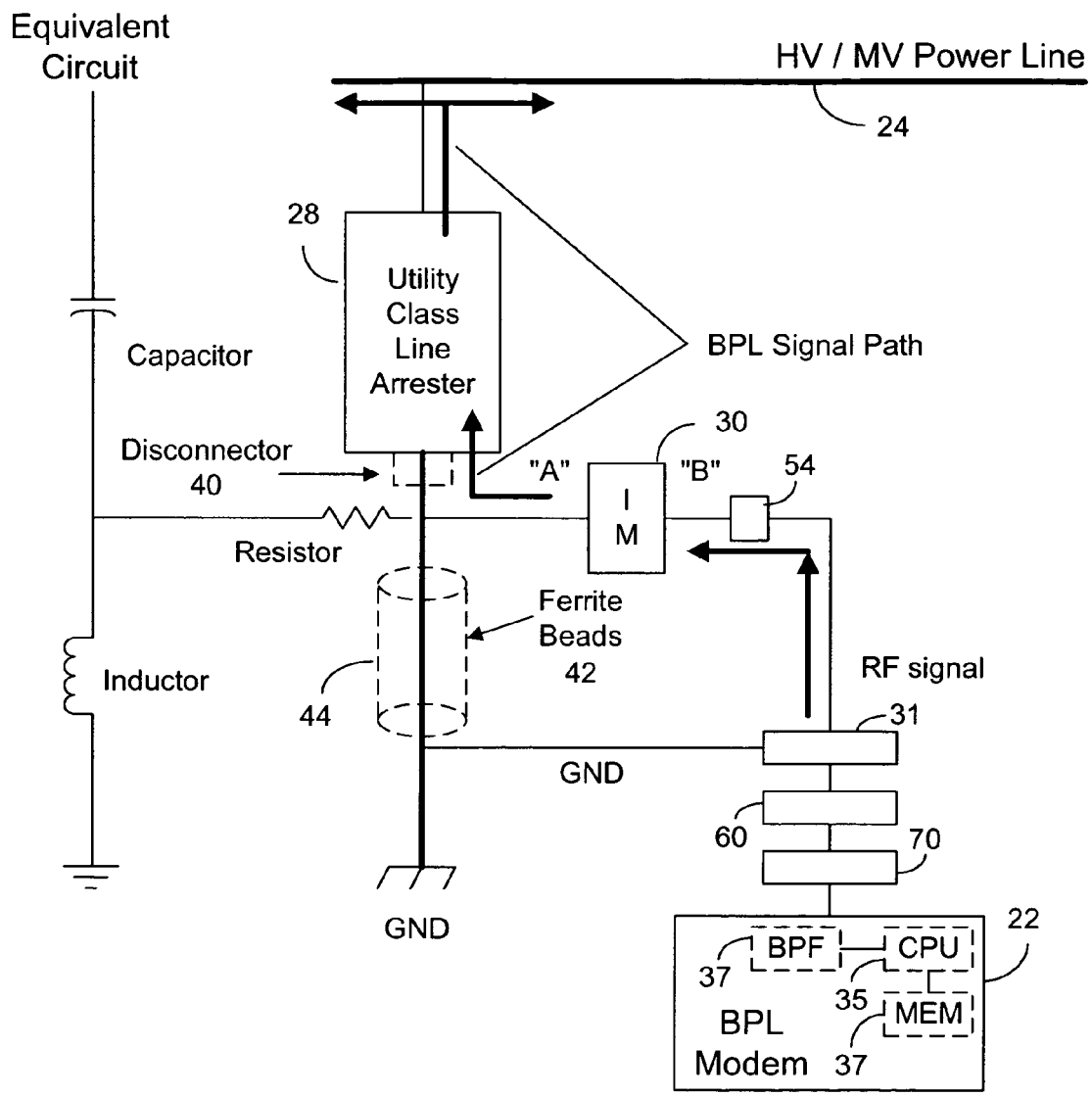
FIG. 5 is a detailed block diagram of an HVBPL capacitive coupler with directional launch according to the present invention

FIG. 5 is an electrical diagram that represents the HVBPL coupler design and associated elements. The selection of a lightning line arrester 28 that acts as a capacitor is done based on its transfer function within the operating range of the BPL signal (e.g. to exhibit low impedance for a signal in the range of 1 MHz to 50 MHz). Ferrite beads 42 are positioned around grounding cable 44 so as to present a high impedance for the operating frequency of the BPL modem 22 (e.g., in the frequency range of 1 MHz to 50 MHz). A disconnect device 40 is optionally used to provide a physical disconnect from the line arrester in case of a lightning strike. This is generally only required for a repeater where the line arrester is physically mounted on a pole rater than in a substation.

The electrical circuit is represented by:
"C"—capacitance of lightning arrester.
Arrester selected based on its capacitance value in BPL operating range of 1-50 MHz.
"L"—inductance of ferrite beads.
Ferrite beads selected based on its inductance value to represent a high impedance in BPL operating range.
"R"—resistance on line elements as presented at point A.
IM—Impedance matching Circuit: matches impedances as points A and B for optimal launch of RF signal.
Ferrite beads represent a high impedance that minimizes energy leakage into GND.
Energy of RF BPL signal travels through the capacitance of lightning arrester onto power line.

As seen in FIGS. 4 and 5, any of the BPL modems 22 can further incorporate a band pass filter (BPF) for band pass filtering (i.e., allowing) certain frequency channels to pass through the BPL modem. In an embodiment of the present invention, the channels can have a bandwidth of 5 MHz starting at 2 MHz. Channel 1, for example, would operate between the frequencies of 2-6 MHz. A plurality of channels can be, for example, from 2-34 MHz. Other operational bands can, of course, be used. These bands can be controlled by a CPU 35 under program control (the program code being stored in memory 37).

Figure 6:
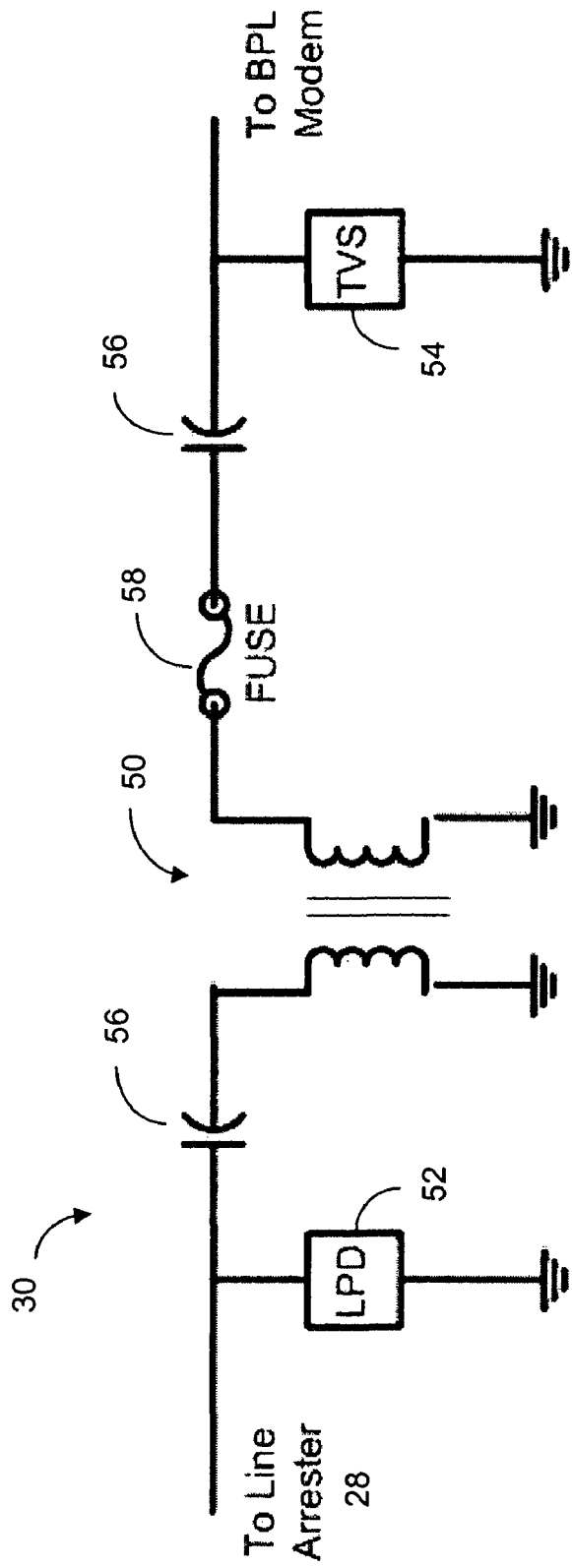
FIG. 6 is a schematic diagram of an impedance matching circuit according to the present invention

FIG. 6 illustrates the impedance matching circuit 30 that is part of the HVBPL coupler design. The impedance matching circuit optimizes the transmission of the BPL signal by minimizing losses due to resistive mismatch of the impedance of the line and the coax cable 26 of the coupler. The circuit contains a transformer 50, a lightning protection device 52, a line limiter 54 such as a transient voltage suppressor, capacitors 56 and a fuse 58. The lightning protection device is connected to the bottom of the line arrester 28 and shunts to ground any high voltage spikes that get through the arrester. This added layer of protection protects the electronic circuits downstream in the differential module (if present) and the BPL modem. There are also protective elements described below which can be standalone or part of the differential module. The modem can also have protective elements itself.

Figure 7:
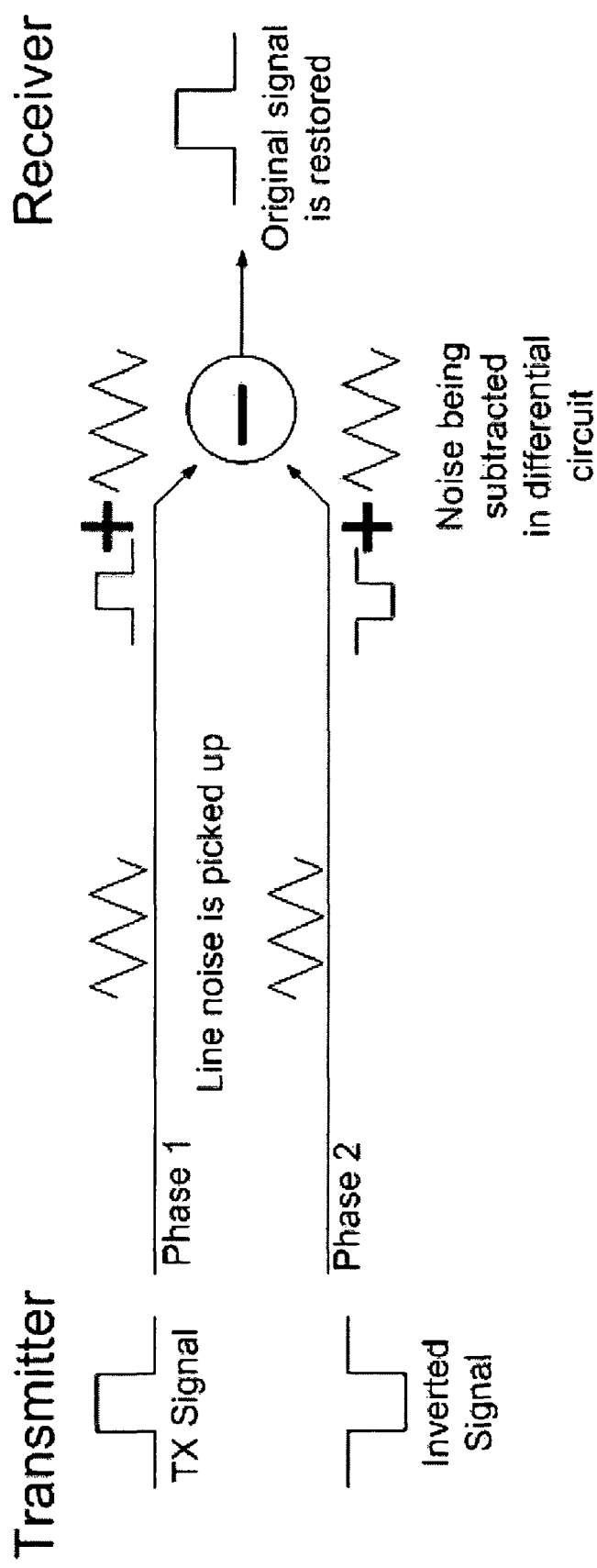
FIG. 7 is a diagram illustrating differential circuit operation according to the present invention

The conceptual operation of the differential module is shown in FIG. 7. Noise mitigation is the biggest challenge for any on-the-wire transmission technology since the power lines act as an antenna that pick up RF noise in the operating frequencies of the BPL signal. Sources of noise can be coming from the line itself (conducted noise) or from the air (radiated noise). Effective noise cancellation requires two well balanced lines. The balancing is done by injecting the signals on both phases at one end using an external function generator or the BPL modem, and inspecting them on both phases at the other end using an RF oscilloscope in the time domain. The balancing requires extending the path length of one of the phases until both signals are matched at their arrival time. Based on empirical tests, the added distance cannot be more than six feet apart for optimal noise cancellation.

Figure 8:
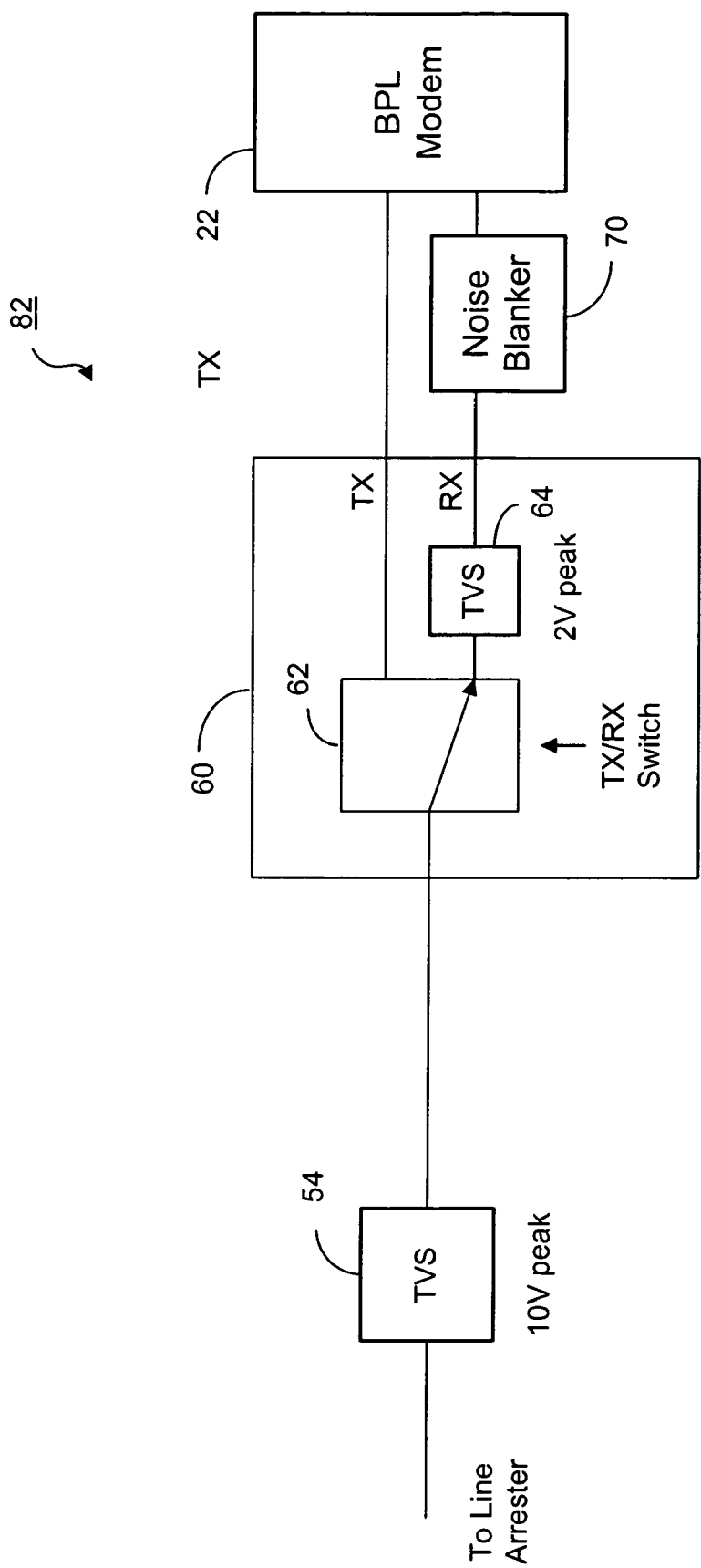
FIG. 8 is a schematic diagram of a noise limiter circuit block diagram according to the present invention

An overall limiter circuit configuration 82 is shown in FIG. 8. The limiter circuit protects the BPL transmitter and receiver front end circuits of the BPL modem. The first limiter 54 is typically near the impedance matching circuit 30 as shown in FIG. 6. This limiter is typically a TVS placed near the line coupler and clips any voltage level that has a peak over 10 volts. A second limiter 60 is optionally placed in front of the BPL receiver and is only activated when the modem is in receiving mode. This second limiter clips the incoming signal to a peak of 2 volts. This limiter comprises a transmit/receive switch 62 and a second TVS 64.

Figure 9:
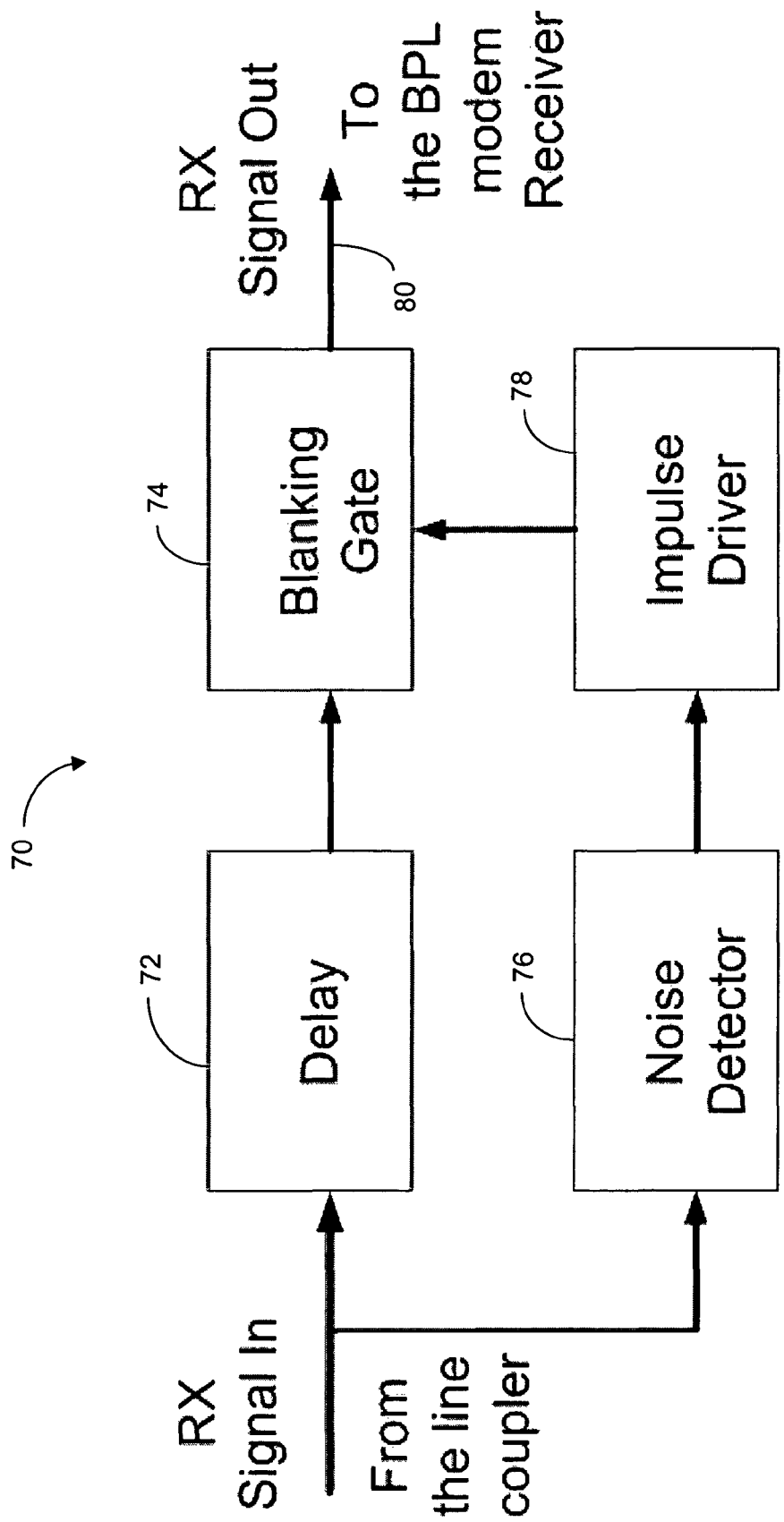
FIG. 9 is a schematic diagram of a noise blanker circuit block diagram according to the present invention
Figure 13:
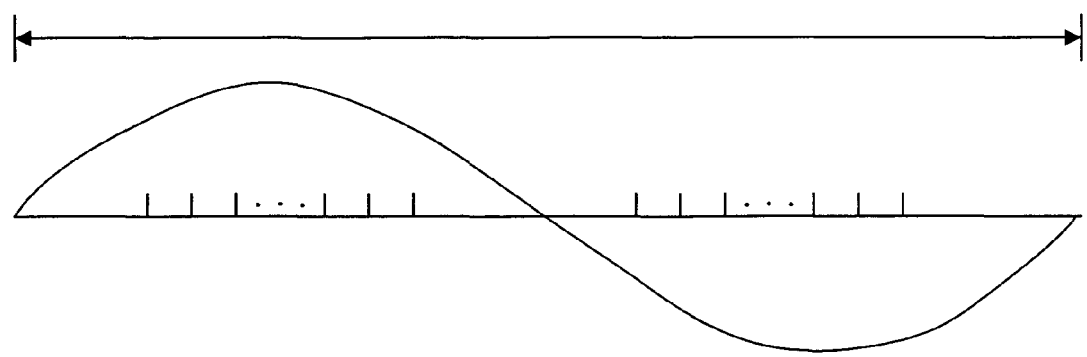
FIG. 13 is an electrical waveform illustrating electrical impulse noise train characteristics that can be present on a broadband signal carried over HV power lines and which can be gated (removed) by a noise blanker used in blanker circuit design according to the present invention

The function of a noise blanker 70 as shown in FIG. 9 is to protect the BPL receiver from high amplitude narrow pulse transient noise that may degrade system performance. The characteristics of this type of noise is shown in FIG. 13. The noise blanker is normally placed near or in the BPL modem 22 in front of the receiver RX portion of the modem and before the differential module 32 (see FIG. 10) if differential reception/transmission is employed. The noise detector controls the operation of the blanking gate allowing the input signal only during quiet periods. The delay line compensates for path differences in the time domain. Noise blanker circuit 70 comprises a delay circuit 72, a blanking gate 74, a noise detector 76, and an impulse driver 78. In operation, the communication signal received via the power line is presented to both the delay circuit 72 and the noise detector 76. If the noise level, which is typically short time duration noise pulses (see FIG. 13), is greater than a predetermined level, the noise detector generates a signal to the impulse driver 78 which in turn sends a signal to the blanking gate 74. At the same time, the incoming signal is delayed by the delay circuit 72 prior to presentation to the blanking gate 74. Thus, if a noise pulse is sensed by the noise detector, the blanking gate effectively blocks the passing of that signal containing the noise for the duration of the noise at the RX signal out point 80 and thus prevents the noise pulse from reaching the receive side of BPL modem 22.

Impulse Train Characteristics:
Isolated Impulses are 20-30 nS in width
Inter-pulse delays 200-800 uS
Cluster duration, 2-4 mS repeated every half line cycle
Pseudo-Synchronous
Peak amplitude 100 mV-90V.

Figure 10:
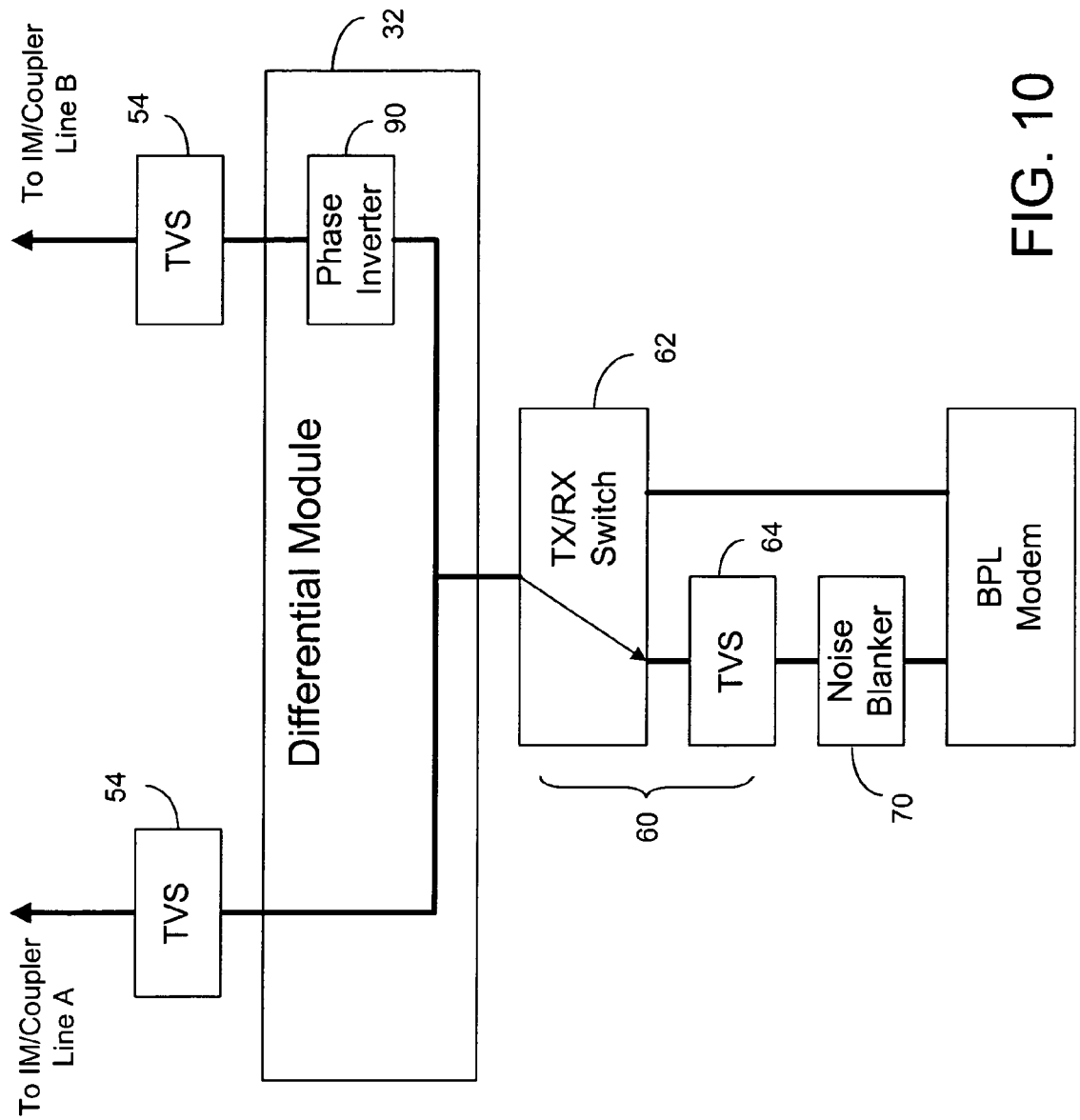
FIG. 10 is a schematic diagram showing a differential module according to the present invention

FIG. 10 is a block diagram of the differential module 32 showing its relationship to other elements of the present invention. The differential module includes a phase inverter 90 that generates an inverted (180° phase change) of any outgoing communication signal so as to present it on one of the two high voltage lines.

Implementation Embodiment

The present invention can be implemented in various embodiments, such as (but not limited to) the embodiments described below, as well as those previously discussed.

A first embodiment of the present invention is a method and a system for station to station and station to control center communications over electric transmission lines using BPL technology and named HVBPL. Each communications system can use one or two BPL modems. A modem can be used as FDM master, as FDM slave or as a TDM repeater. BPL modems operate in the range of 1 MHz to 50 MHz (see FIGS. 1 and 3).

A second embodiment of the present invention is the first embodiment operating in FDM (Frequency Division Multiplexing) and/or TDM (Time Division Multiplexing) mode. In FDM mode, BPL modems are configured as master or slave. In TDM mode, BPL modems are configured as TDM repeater.

A third embodiment of the present invention is the second embodiment, over a single or multiple line segments. When multiple line segments are used, in FDM mode the intermediate repeating unit (see FIG. 2) uses two BPL modems (such as shown in FIG. 3 for the station to station configuration), one configured as slave and the other configured as master. In TDM mode the intermediate repeating unit uses two BPL modems configured as TDM repeaters.

A fourth embodiment of the present invention is the third embodiment, using Station class arrester couplers for communications units that are installed inside stations and Transmission Line (T-Line) class arrester couplers for repeating units that are installed on Transmission poles.

A fifth embodiment of the present invention is the fourth embodiment, using selected lightning arresters as line arresters 28 for capacitive coupling of the BPL RF signal and selected ferrite beads 42 for directional launch of the BPL RF signal (see FIG. 5).

A sixth embodiment of the present invention is the fifth embodiment, using an impedance matching circuit 30 and matching coax cable lengths 26 for optimal signal performance of the BPL RF signal (see FIGS. 2 and 3).

A seventh embodiment of the present invention is the sixth embodiment, using differential coupling (differential module 32) over two balanced transmission lines 26 for noise cancellation and added stability. The noise cancellation is implemented by the electrical circuit inside of the differential box. The noise cancellation is achieved by transmitting the BPL signal straight on one phase, and inverted on the second phase (see FIGS. 7 and 10). At the receiver end, the differential box subtracts the received signals from both phases. The result of the subtraction reduces any parasitic noise that was picked up by the lines and amplifies the received signal while increasing the overall SNR (Signal to Noise Ratio).

An eighth embodiment of the present invention is the seventh embodiment, where the two phases are matched in the time domain for RF distance within six feet difference.

A ninth embodiment of the present invention is the third embodiment, using band pass filters 33 that block out of band noise effects and improve stability and flexibility.

A tenth embodiment of the present invention is the ninth embodiment, using software controlled (CPU 35 and memory 37) and selectable band pass filters 33 providing ease of configuration and flexibility to select the best operating frequency band.

An eleventh embodiment of the present invention is the tenth embodiment, where the band pass filters use a fixed frequency channel (e.g. 5 MHz) channels starting at 2 MHz.

A twelfth embodiment of the present invention is the eleventh embodiment, using software selectable attenuators to set the Transmit (TX) gain level providing granularity in setting the amplitude of the transmitting signal for FCC compliance.

A thirteenth embodiment of the present invention is the twelfth embodiment, using link aggregation (link aggregation switch 38—see FIGS. 3, 14, and 15) for improved redundancy and high availability. In link aggregation mode, the transmitter uses two different frequency channels on the two phases. The receiver combines the received signal from both phases and the link aggregation protocol maintains both links. If one link goes down, the other link picks up all the traffic seamlessly. If both links are up and active, the link aggregation protocol provides a higher system throughput by combining the two data links. It compensates for a slow link that can be affected by temporary noise on that phase.

A fourteenth embodiment of the present invention is the third embodiment, using RF protective circuits (limiter circuits) 54 and 60 that limit the amplitude of the input and output signal.

A fifteenth embodiment of the present invention is the fourteenth embodiment, using a TVS (Transient Voltage Suppressor) device to implement the limiter circuit.

A sixteenth embodiment of the present invention is the third embodiment, using RF protective circuits (e.g., noise blanker 70) that detect transient noise events and silence the receiver during the presence of a transient noise event.

A seventeenth embodiment of the present invention is the sixteenth embodiment, using a blanking gate function controlled by a noise detector and time balanced by a line delay to protect the receiver circuit (see FIG. 9).

An eighteenth embodiment of the present invention is the third embodiment, using a Transmission Line Arrester (TLA) for a pole mounted intermediate repeater node with a disconnect device 40 for safety.

A nineteenth embodiment of the present invention is the eighteenth embodiment, with a CCVT (Coupling Capacitor Voltage Transformer) or a PT (Potential Transformer) device for providing a low voltage AC power source to pole mounted BPL communications equipment and using a DC battery backup unit to maintain communications during loss of primary power.

This description is provided only by way of example, and does not in any way limit the scope of the present claimed invention. A person skilled in the art will understand that various different materials and configurations can be arranged in a variety of ways to achieve the type of apparatus that is the subject of the present invention.

What is claimed is:
1. A communication device comprising:
an impedance matching circuit configured to connect at one end to a high voltage line arrester of a high voltage power line acting as a capacitor, connected to the high voltage power line;
a limiter circuit coupled to another end of the impedance matching circuit to limit a voltage associated with a signal; and
a noise blanker circuit coupled at a first end to said another end of the impedance matching circuit and configured to connect at a second end to a broadband modem, the noise blanker circuit having a delay circuit configured to time delay an incoming signal from the impedance matching circuit, a noise detector configured to detect electrical noise, and a blocking gate configured to receive the time delayed incoming signal and to inhibit presentation of said time delayed incoming signal to said broadband modem upon detection of electrical noise by the noise detector.

2. The communication device as defined in claim 1, further comprising a high frequency impedance blocking device configured to present a high frequency impedance between earth ground and the line arrester and further configured to be coupled to the noise blanker circuit.

3. The communication device as defined in claim 2, wherein the high frequency impedance blocking device comprises ferrite beads.

4. The communication device as defined in claim 1, wherein the noise blanker circuit is configured to connect to a receiver of the broadband modem at said second end and to a differential circuit at said first end, the differential circuit configured to present a transmission signal from said modem in both a non-inverted and a substantially inverted form, the non-inverted form of the transmission signal configured to be presented to the impedance matching circuit; wherein the communication device further comprises a second impedance matching circuit, a second limiter circuit, the second impedance matching circuit configured to receive the inverted transmission signal for presentation to a second high voltage power line through a second line arrester.

5. The communication device as defined in claim 4, further comprising a second limiter circuit configured to present a voltage suppression of the incoming signal, the second limiter circuit having a suppression voltage lower than the suppression voltage of the limiter circuit coupled to the impedance matching circuit.

6. The communication device as defined in claim 5, wherein the second limiter circuit receives the incoming signal via a transmit/receive switch which in turn is operable to connect the incoming signal to a transient voltage suppressor when a signal is being received.

7. The communication device as defined in claim 6, wherein the peak voltage of the transient voltage suppressor is approximately two volts.

8. A communication system comprising a plurality of communication devices according to claim 4, each communication device configured to connect to the high voltage power lines at physically separated locations of said power lines.

9. The communication device as defined in claim 4, further comprising a link aggregation switch configured to be connected to said broadband modem and a second broadband modem downstream from said differential circuit, the link aggregation switch configured to provide link aggregation to said signal.

10. The communication device as defined in claim 1, wherein the limiter circuit coupled to the impedance matching circuit limits the signal if the signal has a voltage greater than approximately 10 volts.

11. The communication device as defined in claim 1, wherein the line arrester has a high capacitance value for RF signals ranging from approximately 1 to 50 MHz.

12. The communication device as defined in claim 1, further comprising a disconnect device positioned between the line arrester and the impedance matching circuit, the disconnect device configured to disconnect the line arrester from the remainder of the communication device if an associated power line is struck directly by lightning.

13. The communication device as defined in claim 1, further wherein the impedance matching circuit comprises a lightning protection device to protect the remainder of the impedance matching circuit from lightning strikes.

14. The communication device as defined in claim 13, further comprising a second limiter circuit configured to present a voltage suppression of the incoming signal, the second limiter circuit having a suppression voltage lower than the suppression voltage of the limiter circuit coupled to the impedance matching circuit.

15. The communication device as defined in claim 14, wherein the second limiter circuit receives the incoming signal via a transmit/receive switch which in turn is operable to connect the incoming signal to a transient voltage suppressor when a signal is being received.

16. The communication device as defined in claim 15, wherein the peak voltage of the transient voltage suppressor is approximately two volts.

17. A communication system comprising a plurality of communication devices according to claim 1, each communication device configured to connect to the high voltage power line at physically separated locations of said power line.

18. The communication device as defined in claim 1, wherein the limiter circuit is a transient voltage suppressor.

19. The communication device as defined in claim 1, configured to be operable with power lines having a power line voltage in excess of 30 KV.

20. The communication device as defined in claim 1, further comprising a link aggregation switch configured to be connected to said broadband modem and a second broadband modem downstream from said noise blanker circuit, the link aggregation switch configured to provide link aggregation to said signal downstream from said noise blanker circuit.

21. The communication device as defined in claim 4, further comprising a bandpass filter configured to limit the signal associated with the broadband modem within a predetermined frequency range.

22. The communication device as defined in claim 21, further comprising a processor configured to control the frequency range of the bandpass filter.

23. The communication device as defined in claim 1, further comprising a bandpass filter configured to limit the signal associated with the broadband modem within a predetermined frequency range.

24. The communication device as defined in claim 23, further comprising a processor configured to control the frequency range of the bandpass filter.

25. A method of communicating broadband information over a high voltage power line comprising:
receiving an incoming signal from the high voltage power line containing broadband information after said signal is passed through a line arrester connected to the power line;
delaying the incoming signal and simultaneously detecting the incoming signal for the presence of electrical noise and, if present and if electrical noise is detected, blocking the delayed incoming signal so as not to be presented to a broadband modem and further presenting an outgoing signal from the broadband modem to an impedance matching circuit so as to impedance match the outgoing signal to the impedance of the power line and associated line arrester while simultaneously providing a high impedance between the outgoing signal and ground for the operating frequency band of the outgoing signal.

26. The communication method as defined in claim 25, further comprising performing the recited actions for a second high voltage power line, wherein the outgoing signal presented to the second high voltage power line is substantially inverted with regard to the outgoing signal presented to the first high voltage power line.

27. The communication method as defined in claim 25, further comprising performing link aggregation of the signal relative to two broadband modems.

* * * * *